United States Patent
Klenske et al.

(10) Patent No.: US 11,762,346 B2
(45) Date of Patent: Sep. 19, 2023

(54) METHOD AND DEVICE FOR DETERMINING A CONTROL STRATEGY FOR A TECHNICAL SYSTEM

(71) Applicant: Robert Bosch GmbH, Stuttgart (DE)

(72) Inventors: Edgar Klenske, Renningen (DE); Lukas Froehlich, Freiburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 101 days.

(21) Appl. No.: 17/605,485

(22) PCT Filed: Jun. 3, 2020

(86) PCT No.: PCT/EP2020/065378
§ 371 (c)(1),
(2) Date: Oct. 21, 2021

(87) PCT Pub. No.: WO2020/245218
PCT Pub. Date: Dec. 10, 2020

(65) Prior Publication Data
US 2022/0197229 A1    Jun. 23, 2022

(30) Foreign Application Priority Data
Jun. 6, 2019    (DE) .................... 10 2019 208 263.7

(51) Int. Cl.
*G05B 13/04*    (2006.01)
*G05B 13/02*    (2006.01)
*G06F 18/2415*    (2023.01)

(52) U.S. Cl.
CPC ....... *G05B 13/042* (2013.01); *G05B 13/0265* (2013.01); *G06F 18/24155* (2023.01)

(58) Field of Classification Search
CPC .................... G05B 13/042; G05B 13/0265
(Continued)

(56) References Cited

U.S. PATENT DOCUMENTS

2016/0239000 A1    8/2016  Yan et al.
2018/0349158 A1*  12/2018  Swersky ................ G06N 20/00
2020/0327264 A1*  10/2020  Wang ..................... H02J 3/008

FOREIGN PATENT DOCUMENTS

WO    2018219943 A1    12/2018

OTHER PUBLICATIONS

International Search Report for PCT/EP2020/065378, dated Oct. 2, 2020.

(Continued)

*Primary Examiner* — Jigneshkumar C Patel
(74) *Attorney, Agent, or Firm* — NORTON ROSE FULBRIGHT US LLP; Gerard Messina

(57) ABSTRACT

A computer-implemented method for creating a control process for a technical system using a Bayesian optimization method, the control process being created and executable based on model parameters of a control model, the following steps being performed in order to optimize the control process: furnishing a quality function that corresponds to a trainable regression function, and that assesses a quality of a control process of the technical system based on model parameters; executing a Bayesian optimization method based on the quality function in order to iteratively ascertain an optimized model parameter set having model parameters, such that during execution of the Bayesian optimization method, a model parameter domain that indicates the permissible value ranges for the model parameters is expanded, by an amount equal to an expansion distance, with respect to those dimensions for which the model parameter ascertained in the current iteration lies at a range boundary.

10 Claims, 3 Drawing Sheets

(58) Field of Classification Search
USPC .......................................................... 700/28
See application file for complete search history.

(56) References Cited

OTHER PUBLICATIONS

Volpp et al., "Meta-Learning Acquisition Functions for Bayesian Optimization," Cornell University Library, 2019, pp. 1-11.

Neumann-Brosig et al., "Data-Efficient Auto-Tuning With Bayesian Optimization: an Industrial Control Study," Cornell University Library, 2018, pp. 1-11. <https://arxiv.org/pdf/1812.06325.pdf> Downloaded Oct. 2, 2021.

Brochu et al., "A Tutorial on Bayesian Optimization of Expensive Cost Functions, With Application To Active User Modeling and Hierarchical Reinforcement Learning," Cornell University Library, 2010, pp. 1-49. <https://arxiv.org/pdf/1012.2599.pdf> Downloaded Oct. 2, 2021.

Shahriari et al., "Unbounded Bayesian Optimization via Regularization," Proceedings of the 19th International Conference on Artificial Intelligence and Statistics (AISTATS), 2016, pp. 1168-1176. <http://proceedings.mlr.press/v51/shahriari16.pdf> Downloaded Oct. 2, 2021.

Nguyen Vu et al. "Bayesian Optimization in Weakly Specified Search Space" 2017 IEEE International Conference on Data Mining (ICDM), IEEE, 2017, pp. 1-10. <https://dro.deakin.edu.au/eserv/DU:30108622/gupta-bayesianoptimization-accepted-2017.pdf> Downloaded Oct. 2, 2021.

* cited by examiner

METHOD AND DEVICE FOR DETERMINING A CONTROL STRATEGY FOR A TECHNICAL SYSTEM

TECHNICAL SYSTEM

Field

The present invention relates to methods for discovering a suitable control strategy for a technical system, in particular utilizing a Bayesian optimization method. The present invention relates in particular to a computer-implemented method for more-efficient optimization of model parameters of a control model for implementation of a control strategy for a technical system.

Background Information

In so-called "reinforcement learning," a control system repeatedly interacts with the environment and, from the system behavior, autonomously learns an action strategy. The learning procedure is accomplished by minimizing a cost value that is indicated by a cost function or quality function, and that assesses a performance capability of the control system.

Model-free reinforcement learning methods are particularly advantageous, since no knowledge of the environment and of the environment's interaction with the system is necessary; but the system's interaction time with the environment during the learning process is very long. In conventional model-based methods, conversely, a model structure that describes in principle the control system's behavior in the environment is initially specified. The effects of the control system's interaction with the environment can thereby be mapped. The model structure can be easily and efficiently adapted by parameter adaptation. The conventional method has disadvantages, however, since the selected model structure may be unsuitable, and the parameter adaptation resulting from optimization of the control model therefore may not yield an optimal result.

Creation and optimization of a control model in conjunction with reinforcement learning can be carried out in combination with a Bayesian optimization, the cost function being modeled as a Gaussian process model. This makes possible the creation of an efficient black-box optimizer for control models that would otherwise be difficult to create or parameterize. Optimization is very laborious, however, because of the large number of model parameters in such control models, so that a large number of measurement operations is necessary and long training times are the rule due to the large volume of measured data.

SUMMARY

The present invention provides a method for creating a control process for a technical system, apparatus, and a system.

Further embodiments are disclosed herein.

According to a first aspect of the present invention, a method for creating a control process for a technical system with the aid of a Bayesian optimization method is provided, the control process being created and executable based on model parameters, the following steps being performed in order to optimize the control process:

furnishing a quality function whose form corresponds to a trainable regression function, and which assesses a quality of a control process of the technical system based on model parameters;

executing a Bayesian optimization method based on the quality function in order to iteratively optimize a model parameter set having model parameters, such that during execution of the Bayesian optimization method, a model parameter domain that indicates the permissible value ranges for the model parameters is expanded with respect to those dimensions for which the model parameter respectively ascertained in the current iteration lies at a range boundary.

In accordance with an example embodiment of the present invention, a control model is created in order to model the control process of a control system. The control model defines a control strategy, and represents a functional relationship with which a manipulated variable is calculated based on one or several input variables of the control process. At least one of the input variables corresponds to a state variable of the technical system that is to be controlled.

The form of the control model can be defined in a number of ways. For example, the control model can contain, or be based on, a formula relationship that is based on physical laws, for instance equations of motion, oscillation equations, damping behavior, etc. The control model can also be based on a formula relationship that is freely selected or otherwise determined. The formula relationship often must take into account a nonlinear behavior of the technical system.

Bayesian optimization methods for ascertaining a control model iteratively apply various control strategies using a technical system, and efficiently optimize the control process. The quality function can be modeled with the aid of a trainable regression function, in particular with the aid of a Gaussian process regression, in order to model the performance capability of the system model as a function of the model parameters of the control model, the Gaussian process regression being created based on measured (and therefore noisy) state variables.

The essence of the problem is to discover a control strategy that maps a system state onto an input variable vector. For this, a behavior of the control process of the technical system which depends on the model parameters of the control strategy is evaluated over a predetermined time horizon based on the state variable vectors (from several state variables) and input variable vectors (from several input variables) in order to determine a quality of the behavior of the technical system. The quality of the behavior of the technical system can be determined by an assessment with respect to a desired behavior. For example, criteria such as oscillation susceptibility, settling time, interference sensitivity, robustness, and/or the like can be assessed. The behavior of the control process of the technical system is also referred to as an "unknown function." The quality function (cost function) corresponds to a mathematical model that assesses the quality of the behavior of the control process of the technical system depending on the model parameters of the underlying control strategy.

Bayesian optimization is generally used when an unknown function f, called a "black-box function," which corresponds to a behavior of the technical system, is to be minimized. This unknown function f can be evaluated or measured, and observed (possibly in a noisy context), for only one value x. The observed value y is obtained as $y=f(x)+e$, where e refers to the noise component. It is furthermore assumed that each evaluation or measurement of the unknown function f is expensive, i.e., results in costs in the sense that evaluation of the unknown function causes a high expenditure, as is the case, for instance, when performing an experiment on a test stand. Because evaluation of the unknown function is costly, it is desirable to require execution of only a few evaluations during optimization.

Given certain presuppositions, for example that the system behavior or the unknown function is steady-state, the unknown function can be approximated with a Gaussian process regression using the quality function. For this, after an evaluation of the unknown function at several evaluation points ($x_1, \ldots, x_n$) and observation of the corresponding function values ($y_1, \ldots, y_n$), the quality function can be trained with the aid of the Gaussian process. One property of the Gaussian process is that in regions around the evaluation points, the model prediction is very good and the unknown function, i.e., the system behavior, is approximated well. This is reflected in a low uncertainty in the quality function. Further away from the evaluation points, the model predictions of the quality function by way of the unknown function become poor, and the uncertainty increases with increasing remoteness from the evaluation points.

One possible strategy for optimizing the model parameters of the control strategy, and thus the system behavior, is to evaluate the unknown function at many different points (for example, in a regular grid), and to assume the lowest observed function value as the result of the optimization. This procedure is inefficient, and many evaluations with correspondingly high outlay are necessary in order to arrive at the optimum.

Instead of this approach, the quality function is used in order to select new evaluation points. For this, a new evaluation point for evaluation or measurement of the system behavior is selected in such a way that on the one hand the informative value of the quality function is improved, so that the uncertainty of the estimated expected value of the quality function is reduced. This is done, generally, by selecting the evaluation points in ranges in which the unknown function has not yet been evaluated or the technical system has not yet been measured (exploration). On the other hand, a new evaluation point for evaluating the unknown function or for measuring the technical system is selected so that the objective of finding an optimum is reached as quickly as possible or with a small number of measurements at the evaluation points. Preferred evaluation points to be selected for this, based on the Gaussian process, are those that promise low function values (exploitation). These two conflicting criteria are balanced against each other by the fact that the evaluation point is selected with the aid of a specified acquisition function.

The acquisition function uses parameters of the quality function that is described by a Gaussian process model, for example the expected value $\mu(x)$ and the standard deviation $\sigma(x)$ associated with that expected value. One example is the lower confidence bound (LCB) acquisition function, which is described as follows: $LCB(x)=\mu(x)-k\sigma(x)$. The factor k is often defined in practice as a constant, for instance at a specific value such as k=2. This new criterion can be efficiently minimized using ordinary gradient-based methods, and the minimum of $LCB(x)$ then constitutes the new evaluation point for the unknown function f or for measuring the technical system. To be noted in this context is that optimization of the quality function requires definition of a model parameter domain that indicates value ranges for the respective model parameters within which the next evaluation point will be searched for. These model parameter domains are typically selected based on empirical and/or expert knowledge.

After evaluation of the behavior of the technical system (for instance by measurement at the evaluation point), the trainable regression function is updated or retrained using the new data, and a next evaluation point is selected using the method described above. Typically, this process is repeated until a termination criterion is met, i.e., for instance the length of time that is to be spent optimizing the unknown function f (i.e. the behavior of the technical system).

Once the optimization process is complete, the function value x is recommended as the location of the minimum of the quality function, i.e., the value that minimizes the expected value of the Gaussian process.

The LCB criterion is not the only acquisition function that has been proposed in the related art. Other criteria are, for instance, expected improvement (EI), upper confidence bound (UCB), probability of improvement (PI), or "entropy search" methods that are based on information-theory considerations.

In accordance with the above method, the Bayesian optimization method is used to discover the model parameters of the control strategy by minimizing the initially unknown quality function.

The objective is to create the control model in such a way that the behavior of the technical system corresponds as accurately as possibly to the desired specifications. The quality function can, if applicable, be constantly updated, depending on the respective model parameters, in accordance with the performance capability of the control system. Updating of the quality function requires an assessment of the respective model parameters, which necessitates operation of the control system in the real environment using the respective model parameters. During operation of the control system, a quality distance that reflects the quality of the behavior of the technical system thereby being controlled is detected, and is associated with the current model parameters. Because of the need for real operation of the control system for the measurement process, improving the cost assessment by continuous updating of the quality function becomes very laborious. It is therefore desirable to minimize as much as possible the number of measurement operations on the real technical system.

In accordance with an example embodiment of the present invention, after one or several measurement operations, the respective quality function, along with the most recently measured model parameters, and the resulting quality distances, can be updated and a new set of test model parameters can be selected by minimizing or maximizing a specified acquisition function that assesses the curve or parameters of the quality function. The acquisition function is specified in such a way that it ensures a compromise between exploration and exploitation. In the context of the method according to the present invention, "exploration" means that preferred ranges of the possible model parameter space for selecting a new test model parameter are ones in which a quality distance has not yet been ascertained by way of a preceding measurement operation, or in which the system behavior has not yet been assessed. "Exploitation" means, in the context of the method according to the present invention, that a test model parameter for the next assessment is selected using a measurement operation that is estimated as a set of optimal model parameters.

It will be assumed hereinafter, by way of example, that the control strategy corresponds to a linear state control strategy of $\pi_\theta(x)=-K(\theta)x$, where K is a control matrix characterizing the control process. Linear control strategies have the advantage that they exhibit low dimensionality as compared with other control models. In addition, the linear regulation strategy can easily be implemented in controllers, thereby increasing the efficiency of the Bayesian optimization.

Control strategy optimization is carried out by adapting the elements of the control matrix. The elements of the control matrix can be assumed directly as model parameters, or assumed to be dependent on model parameters.

During execution of the Bayesian optimization, an estimated value of the optimum of the model parameter values, i.e., of the model parameter values at which the minimum of the trained quality function is located, exists. The model parameter values are determined within value ranges determined by a currently specified model parameter domain. If the result of the Bayesian optimization is that the location of the estimated optimum of the quality function leads to one or several model parameters that lie at a range boundary of the corresponding value regions, it is probable that "better" model parameters lie outside the corresponding value ranges, i.e., the optimum system behavior will be reached using values of the relevant model parameters which lie outside the corresponding value ranges. It is therefore proposed to expand, by an amount equal to the expansion distance, the value range of the model parameter whose value lies at the boundary of the model parameter domain. This dynamic adaptation of the model parameter domain is effected with each recursion of the optimization method, and can be executed in various ways.

Adapting the value ranges for model parameters makes it possible, proceeding from a limited value range, to adapt that range dynamically during optimization only for those dimensions of the model parameter vector for which optimization relates to a boundary region of the model parameter domain. The overall efficiency with which optimization is performed can thereby be increased, so that convergence is substantially improved. In addition, potential model errors can be better compensated for, so that the optimized system model becomes more capable. The improved efficiency makes it possible to scale the Bayesian optimization to higher-dimensional control strategies.

In addition, the expansion distance with respect to the relevant dimensions can be indicated depending on a gradient of a Gaussian process posterior mean of the Gaussian cost function for the respectively current model parameters, the expansion distance assuming a higher relative or absolute value, the greater the gradient.

Alternatively or additionally, the expansion distance can be indicated with respect to the relevant dimensions depending on a length scale of the respective model parameter in terms of the Gaussian process cost function, the expansion distance assuming a higher relative or absolute value, the longer the length scale.

Alternatively or additionally, the expansion distance can be indicated with respect to the relevant dimensions depending on an extent of the respective value range of the relevant model parameter, in particular the expansion distance assuming a higher relative or absolute value, the larger the relevant value range.

According to an example embodiment of the present invention, the model parameters can correspond to, or can determine, elements of a control matrix of a linear state control process.

In particular, the value ranges for the model parameters can be indicated depending on the mean of the respective distribution, on a scaling factor, and on a standard deviation.

In addition, in accordance with an example embodiment of the present invention, a method for adaptive control of a technical system can be provided, model parameters of the control process being adapted during control of the technical system based on one of the above methods.

According to a further aspect of the present invention, an apparatus for creating a control process for a technical system with the aid of a Bayesian optimization method is provided; the control process being created and executable based on model parameters of a control model; in accordance with an example embodiment of the present invention, the apparatus being embodied to perform the following steps in order to optimize the control process:

furnishing a quality function that corresponds to a trainable regression function and assesses a quality of a control process of the technical system based on model parameters;

carrying out a Bayesian optimization method based on the quality function in order to iteratively ascertain an optimized model parameter set having model parameters, such that while the Bayesian optimization method is being carried out, a model parameter domain that indicates the permissible value ranges for the model parameters is expanded, in particular by an amount equal to an expansion distance, with respect to those dimensions for which the model parameter ascertained in the current iteration lies at a range boundary.

According to a further aspect of the present invention, a control system having a technical system and a control unit for controlling the technical system is provided; a control model for furnishing an input variable vector depending on state variables of the technical system being implemented in the control unit; a model creation block being provided in order to ascertain model parameters for the control model on the basis of a Bayesian optimization method executed in an optimization block; the Bayesian optimization method being carried out based on a specified quality function that is determined or specified in a quality function block, such that while the Bayesian optimization method is being carried out, a model parameter domain that indicates the permissible value ranges for the model parameters is expanded, in particular by an amount equal to an expansion distance, with respect to those dimensions for which the model parameter ascertained in the current iteration lies at a range boundary.

BRIEF DESCRIPTION OF THE DRAWINGS

Embodiments will be described in more detail below with reference to the figures.

DETAILED DESCRIPTION OF EXAMPLE EMBODIMENTS

Figure 1:
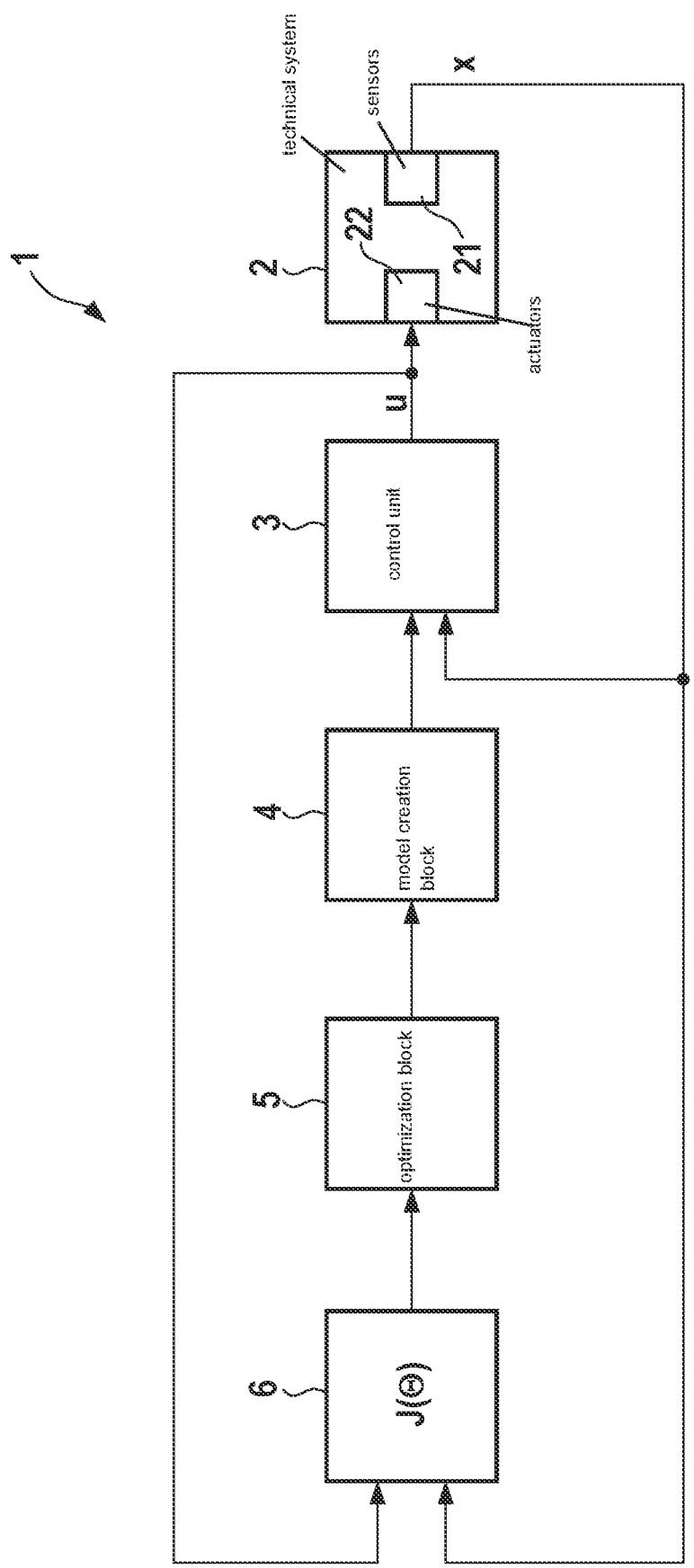
FIG. 1 schematically depicts a control system having a control unit and a technical system that is to be controlled, in accordance with an example embodiment of the present invention.

FIG. 1 schematically depicts a self-adapting control system 1 that is embodied to control a technical system 2. A technical system can be, for example, an internal combustion engine of a motor vehicle or a subsystem thereof. A control unit 3 applies control to technical system 2 with a sequence of input variables u constituting manipulated variables, which result in specific operating points (system states) of technical system 2. Input variables u as a rule encompass a number of several input variables that are combined into an input variable vector $u \in \mathbb{R}^d$. A permissible value range also applies to each of the input variables (elements of the input variable vector u). The application of control to technical system 2 furthermore results in one or several state variables which are measured at an input variable vector u that is to be measured, and which are depicted in the form of a state variable vector x.

With the aid of one or several sensors 21 that are part of technical system 2, it is possible to detect curves of one or several measured variables $x_1 \ldots x_D$ that each yield corresponding state variables $x_1(t) \ldots x_D(t)$ that each represent system states x of technical system 2. D corresponds to the number of state variables. The system state of technical system 2 is thus detected with the aid of the one or several sensors 21, and conveyed to control unit 3 as state variables of a state variable vector x.

Input variables u correspond to manipulated variables of control unit 3 which are ascertained based on state variables x and on control strategy $\pi_\theta(x)$. Operation of technical system 2 occurs depending on input variables u(t) with the aid of one or several actuators 22 of technical system 2. For example, a motion of a robot or vehicle can be controlled, or a drive unit or a driver assistance system of a vehicle can be controlled. An input variable u can correspond, for example, to an electrical voltage that is applied to an electromechanical positioning unit constituting actuator 22. Control is applied to actuator 22 in accordance with the one or several input variables u, and it performs a corresponding action. Actuator 22 can encompass a (not necessarily physically integrated) control application logic that ascertains, from input variables u, a control application variable with which control is applied to the relevant actuator 22.

In an exemplifying embodiment of the present invention, control unit 3 is used to control an internal combustion engine constituting a technical system. For that purpose, a throttle valve setting, a fuel delivery, and/or the like can be defined as input variables respectively to the throttle valve positioner or to the injection valve control application system, and corresponding state variables, for example a rotation speed, a load, an engine temperature, can be received.

In an exemplifying embodiment, control unit 3 is used to control an at least semiautonomous robot, in particular an at least semiautonomous motor vehicle, constituting technical system 2.

Sensor 21 can be, for example, one or several video sensors and/or one or several radar sensors and/or one or several ultrasonic sensors and/or one or several lidar sensors and/or one or several position sensors (e.g. GPS), preferably disposed in the motor vehicle. Alternatively or additionally, sensor 21 can also encompass an information system that ascertains information regarding a state of the technical system (motor vehicle), for example a weather information system that ascertains a current or future state of the weather in an environment of the motor vehicle.

In a further exemplifying embodiment of the present invention, control unit 3 is used to control a function in a motor vehicle constituting a technical system. For this, an accelerator pedal position, a steering input in the form of a wrist moment or a steering position, environmental information such as a position of surrounding objects, a braking intervention, and/or the like can be specified as input variables, and corresponding state variables that indicate the driving behavior of the motor vehicle, for example vehicle speed, cornering status, spacing from surrounding objects, and the like can be received.

Using the several measured variables $x_1, \ldots, x_D$, control unit 3 can detect, for example, states or state curves of the at least semiautonomous robot, for example an engine speed, a vehicle speed, a fuel consumption, an engine temperature, a longitudinal speed and/or a transverse speed, a steering angle, a yaw rate, and the like. Actuator 22 that is preferably disposed in the motor vehicle can be, for example, a brake, a drive system, or a steering system of the motor vehicle.

Alternatively, the at least semiautonomous robot can also be a different mobile robot (not depicted), for example one whose locomotion is based on flying, swimming, diving, or walking. The mobile robot can also be, for example, an at least semiautonomous lawnmower or an at least semiautonomous cleaning robot.

In further alternatives, the at least semiautonomous robot can also be a household appliance (not depicted), in particular a washing machine, a stove, an oven, a microwave, or a dishwasher. A state of an object being treated with the household appliance can be detected with sensor 21, for example an optical sensor, for example, in the case of the washing machine, a state of laundry that is present in the washing machine. A nature or state of that object can be ascertained with control unit 3, and can be characterized by measured variables $x_1 \ldots x_D$. The input variables can then be ascertained in such a way that control is applied to the household appliance depending on the ascertained nature or state of the object. In the case of the washing machine, for example, control can be applied to it depending on the material from which the laundry present therein is made. The input variables u(t) can then be selected depending on the laundry material that has been ascertained.

In a further embodiment, control unit 3 can be used to apply control to a manufacturing machine (technical system 2) of a manufacturing system, by the fact that control is applied, by way of input variables, to an actuator 22 controlling that manufacturing machine. Manufacturing machine 11 can be for example, a machine for stamping, sawing, drilling, milling, turning, and/or cutting.

Sensor 21 can then be, for example, an optical sensor that, for instance, detects properties of manufactured products. It is possible for actuator 22 controlling the manufacturing machine to have control applied to it depending on the ascertained properties of the manufactured product, so that the manufacturing machine correspondingly performs a subsequent processing step for that manufactured product. It is also possible for sensor 21 to ascertain the properties of the manufactured product processed by the manufacturing machine and, depending thereon, to adapt an application of control to the manufacturing machine for a subsequent manufactured product.

The control process of control unit 3 follows a control strategy. The intention is that the control strategy be adapted by way of a dynamic process so that the system behavior becomes optimal in terms of a quality function. This is done by executing an optimization method that optimizes model parameters of the control model on which the control strategy is based, in such a way that the performance capability of the controlled technical system 2 becomes optimized. This is done by creating, in a model creation block 4, a control model (dynamic model) that is the basis for the control strategy of control unit 3. Model creation block 4 ascertains the model parameters for the control model on the basis of a Bayesian optimization method executed in an optimization block 5. This is accomplished based on a specified quality function that is determined or specified in a quality function block 6.

In further preferred embodiments, control unit 3, model creation block 4, optimization block 5, and quality function block 6 are implemented in a computation unit. The computation unit encompasses control device 2, one or several processors, and at least one machine-readable storage medium on which instructions are stored which, when they are executed on the processors, cause the computation unit to execute the method according to the present invention.

Technical system 2 corresponds to a dynamic system that is regulated in optimized fashion with the aid of a control unit 3, using a suitable control strategy that is intended to be created correspondingly with the aid of a Bayesian optimization method. The Bayesian optimization method is used to ascertain the control model by the fact that during the optimization method, various test model parameter sets are iteratively applied to the control of technical system 2, and the model parameters are adapted based on the resulting state variables. A quality function is modeled with the aid of a Gaussian process regression or another trainable regression method with which the performance capability of the control process of technical system 2 is defined as a function of the model parameters.

The performance capability of the control process results from a specified quality criterion (quality distance) that assigns to the resulting state variables of technical system 2 (in particular, to their curves) a control process quality based on a comparison with a desired behavior of technical system 2 that is controlled by the control model based on the model parameters. The state variables are affected by tolerances, so that the quality function is preferably mapped by a Gaussian process regression.

The problem is fundamentally to discover a control strategy that maps a system state x onto an input variable vector $u=\pi_\theta(x)$ where $\pi_\theta: \mathbb{R}^{n_x} \to \mathbb{R}^{n_u}$, where $\theta \in \Sigma \subset \mathbb{R}^{n_\theta}$ represent model parameters of the control strategy in the model parameter domain $\Theta$. A quality function J depending on model parameters $\theta$ is specified over a predetermined time horizon t=0 . . . T based on state vectors x and input variable vectors u, such that model parameters $\theta$ are to be optimized by the optimization method:

$$\min_\theta J(\theta) = \min_\theta \sum_{t=0}^{T} \mathbb{E}[c(x_t, \pi_\theta(x_t))]$$

$$\text{s.t.} \quad x_{t+1} = f(x_t, \pi_\theta(x_t)) + v$$

where $\mathbb{E}$ corresponds to an expected value, $c(x_t, u_t)$ to the quality distance of the state given by state vector $x_t$ when the input variable vector $u_t$ is applied, and $f: \mathbb{R}^{n_x} \times \mathbb{R}^{n_u} \to \mathbb{R}^{n_x}$ represents the state transition model that describes the dynamics of technical system 2 and is furthermore affected by noise variable $v \sim N(0, \Sigma_v)$. The quality distance can be ascertained by comparing the system behavior with a desired system behavior; the quality criterion can indicate a robustness, an oscillation susceptibility, a settling time, and a control process quality.

The Bayesian optimization method serves to discover the optimized model parameters $\theta^*$ of a control strategy by minimizing the quality function (which represents, for instance, the costs). Alternatively, the optimized model parameters $\theta^*$ of the control strategy can also be ascertained, depending on the information content of the quality distances, by maximizing the quality function. The objective is for the control strategy to make possible maximally optimal control of technical system 2 using control unit 3, where "optimal" indicates a minimization/maximization (optimization) of a quality distance that is determined by the quality function depending on the model parameters, and indicates a specified performance capability of the overall system made up of control unit 3 and technical system 2.

The quality function can therefore indicate a quality distance that assesses the deviation of the behavior of the real technical system 2 during the time window t=0, . . . , T with respect to a specified desired performance capability (ideal system behavior). Evaluation of the quality function therefore requires that technical system 2 be operated in the real environment in a measurement operation. Because of the need to operate the control system, which encompasses technical system 2 and control unit 3, in real fashion, assessing the quality distance of the behavior of technical system 2 is very laborious, so that the number of measurement operations on the real technical system 2 for assessment of a specific control strategy should be minimized.

It will be assumed hereinafter that the control strategy corresponds to a linear state control strategy where $\pi_\theta(x)=-K(\theta)x$, where K corresponds to a control matrix whose elements correspond to or depend on the model parameters of the control strategy.

Linear control strategies have the advantage that they have low dimensionality compared with other control models. The linear control strategy can also easily be implemented in controllers, thereby increasing the efficiency of the Bayesian optimization.

During the optimization process, it can happen that the optimal model parameter vector does not lie within the selected model parameter domain. The model parameter domain can therefore be adapted dynamically during optimization.

During execution of the Bayesian optimization, an estimated value of the optimum of the model parameter values, i.e., the minimum of the approximated quality function in the current model parameter domain, exists. If the result of the Bayesian optimization is that the location of the estimated optimum lies at a range boundary of the model parameter domain, it is probable that better model parameters lie outside the current model parameter domain. It is therefore proposed to expand the value range of the model parameter whose value lies at the boundary of the model parameter domain. This dynamic adaptation of the model parameter domain can be effected in a variety of ways.

Adaptation of the value ranges for model parameters makes it possible, proceeding from a bounded value range, to adapt the latter dynamically during optimization only for those dimensions of the model parameter vector at which the optimization encounters a boundary region of the model parameter domain. Optimization can thereby be performed more efficiently overall, so that convergence is considerably improved. Compensation for potential model errors is also better, so that the optimized system model becomes more capable. The improved efficiency makes it possible to scale the Bayesian optimization to high-dimensional control strategies.

Figure 2:
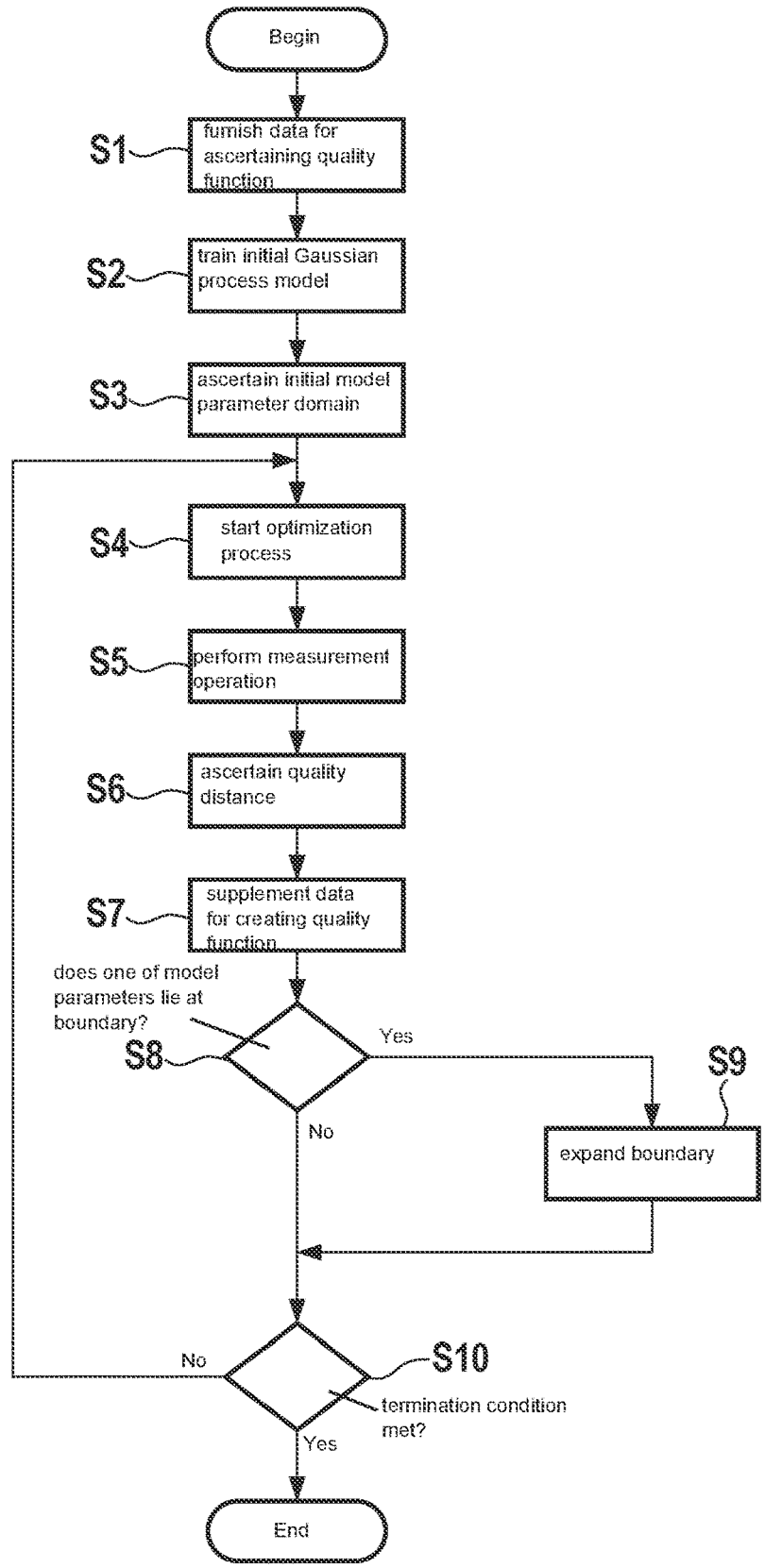
FIG. 2 is a flow chart to illustrate the method for carrying out optimization of a control strategy with the aid of a Bayesian optimization method, in accordance with an example embodiment of the present invention.

In order to illustrate the creation and adaptation of a control process of a technical system, the method will be described below with reference to a flow chart in FIG. 2.

In step S1, firstly data are furnished for ascertaining the quality function for determining the performance capability of the control system in terms of model parameter sets:

$D=\{\theta_i; J(\theta_i)\}$ where $i=1 \ldots n$

In step S2 an initial Gaussian process model, which constitutes the quality function and which maps the test model parameters onto quality distances, is therefore trained:

$\mu(\theta^*)=kK^{-1}J \; \sigma^2(\theta^*)=k(\theta^*, \theta^*)-kK^{-1}k^T$ where K corresponds to the covariance matrix, where $K_{ij}=k(\theta_i, \theta_j), k=[k(\theta_1, \theta^*), \ldots, k(\theta_n, \theta^*)]$ and $J=[J(\theta_1), \ldots, J(\theta_n)]$ The Gaussian process model thus yields both the expected value, i.e., the quality distances, as well as the uncertainty of that expected value.

Provision can also be made that an initial model parameter domain is firstly determined before the first experiments for ascertaining the data are carried out. It is thereby possible to avoid having the initial model parameters not be located in the selected model parameter domain, and thus be useless. A further difficulty is that of selecting the initial model parameters before the model parameter domain is defined.

In step S3, an initial model parameter domain is ascertained. The objective is to select a suitable search region for the model parameters so that the number of measurement operations can be reduced and the optimization method as a whole can be carried out more efficiently. This is necessary in particular at high dimensionality. The initial definition of the model parameters is often done manually, based on expert knowledge. Automatic determination of the model parameter domain is also possible.

In step S4, the optimization process is started.

For this, a new set of test model parameters $\theta'$, in which a specified acquisition function $\alpha(\theta; D_n)$ is maximized or minimized with $D_{n+1}$, is selected. The acquisition function $\alpha(\theta; D_n)$ is specified in such a way that it uses a combination of exploration and exploitation to ascertain a new test model parameter set at a minimum or maximum (depending on the acquisition function selected) of the acquisition function. The acquisition function uses parameters of the quality function created as a Gaussian process model, for instance the Gaussian process expected value $\mu(x)$ and the Gaussian process standard deviation $\sigma(x)$ associated with that expected value. "Exploration" means, in the context of the method according to the present invention, that the regions of the possible model parameter space preferred for the selection of a new test model parameter are those in which the behavior of the technical system has not yet been assessed. "Exploitation" means, in the context of the method according to the present invention, that a model parameter set that is estimated as a set of optimal model parameters is selected for the next assessment of the behavior of the technical system by way of a measurement operation.

$\theta^*=\arg \min_\theta J(\theta); \theta' \leftarrow \theta^*$

One example of an acquisition function is the "lower confidence bound" (LCB) acquisition function, which is described as: $LCB(x)=\mu(x)-k\sigma(x)$. This new criterion can be efficiently minimized using ordinary gradient-based methods, and the minimum of $LCB(x)$ then constitutes the new evaluation point for the unknown function f or for the measurement of technical system 2.

The LCB criterion is not the only acquisition function that has been proposed in the related art. Other criteria are, for example, expected improvement (EI), upper confidence bound (UCB), probability of improvement (PI), or "entropy search methods" that are based on information-theory considerations.

In step S5, a measurement operation is performed and, based on the test model parameter set, a control process of technical system 2 by way of control unit 3 is assessed during the time window $t=0, \ldots T$ in order to correspondingly detect test data in the form of input variables u and resulting state variables x.

In step S6, a quality distance is ascertained based on the test data. This can be achieved, for example, by comparing the system behavior (system states) with desired system states. For example, the system deviations of the control process can be integrated or accumulated in terms of absolute value in order to obtain a quality distance that indicates the robustness of the control process.

In the optional step S7, the data for creating the quality function are supplemented with the test model parameter set $\theta'$ and the associated quality distance $J(\theta')$, i.e. the quality of the resulting control process, and the Gaussian process model that constitutes the quality function is retrained or updated.

Step S8 checks whether one of the model parameters of the test model parameter set lies at a boundary of the model parameter domain. If so ("Yes" branch), in step S9 that boundary of the parameter value range at which one of the model parameters lies is expanded by an amount equal to an expansion distance. Otherwise ("No" branch) the method continues with step 10.

Figure 3:
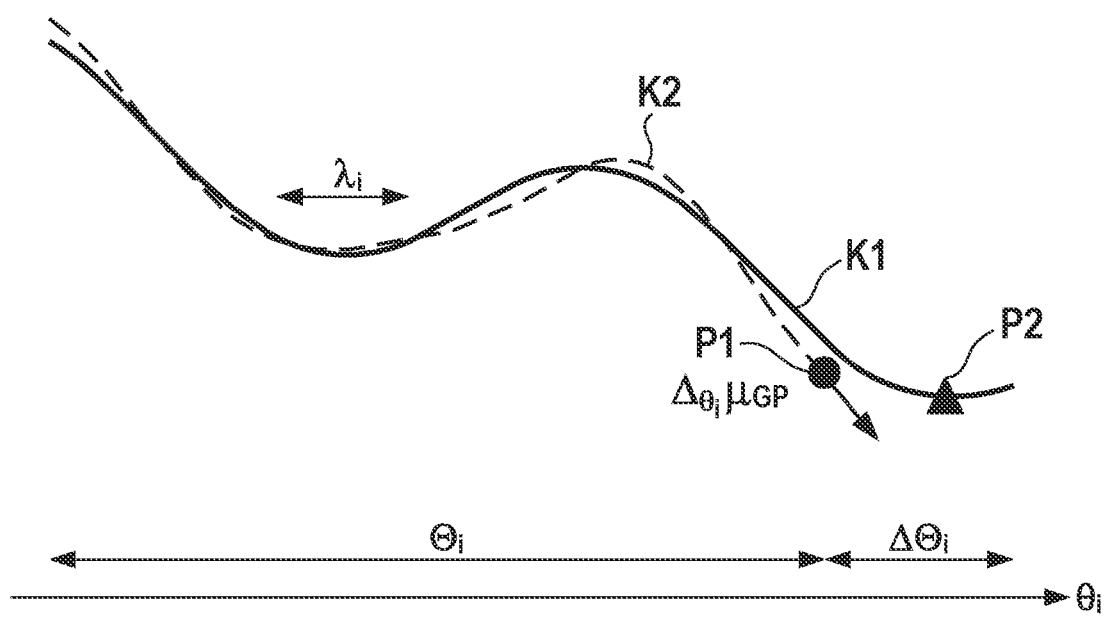
FIG. 3 is a diagram schematically depicting the manner of operation of the dynamic adaptation of the model parameter domains, in accordance with an example embodiment of the present invention.

FIG. 3 is a schematic diagram, for a one-dimensional case, of the curve of a real (K1) and a modeled (K2) quality distance as a function of a dimension of the input variables. $\Theta_i$ indicates the value range of the relevant model parameter of the model parameter domain of the optimization method, and point P1 indicates the model parameter value that lies at a boundary of the model parameter domain. In this case the model parameter domain is expanded by an amount equal to expansion distance $\Delta\Theta_i$ in order to arrive at the optimized model parameter P2, indicated as a triangle, by subsequent iterations of the Bayesian optimization method.

An estimated value of the optimum of the model parameter values, i.e. the minimum of the approximated quality function in the current model parameter domain $\Theta_i$, exists during execution of the Bayesian optimization. If the result of the Bayesian optimization is that the location of the estimated optimum lies at a range boundary of the model parameter domain, it is probable that better model parameters lie outside the current model parameter domain. It is therefore proposed to expand the value range of that model parameter whose value lies at the boundary of the model parameter domain $\Theta_i$. This dynamic adaptation of the model parameter domain $\Theta_i$ can be effected in various ways.

The expansion distance $\Delta\Theta_i$ can be indicated depending on one or several of the following indications:

- on the gradient of the Gaussian process posterior mean at the point of the ongoing estimate of the optimum $\nabla_{\theta_i}\mu_{GP}(\theta^*)$. The gradient is the derivative of that Gaussian process posterior mean in accordance with the relevant model parameter $\theta_i$. If the gradient at the boundary region is high, the potentially better value of the model parameter is farther from the boundary region than if the gradient is low. In other words, for a high gradient the value range of the relevant model parameter is expanded by a higher value than for a low gradient;
- on the length scale of that model parameter, lying at a boundary of the model parameter domain with respect to the Gaussian process, which approximates the quality function. For long length scales, the model assumes that the quality function changes only slowly, and the distance for expanding the value range of the relevant model parameter should thus be increased accordingly; on the extent of the value range $\theta_i$ of the relevant model parameter. If the value range is large, the expansion distance is correspondingly large, and vice versa.

In step S10 a termination condition is then checked, for instance the amount of time that is to be spent for optimization of the quality function, or the number of iterations, or a suitable convergence criterion; and if the optimization method is to be continued ("No" branch), execution branches back to step S4. Otherwise ("Yes" branch) the method is stopped.

The model parameters of the control strategy can be adapted while technical system 2 is being controlled, continuously or at regular or predetermined times, so that the control process of technical system 2 perceptibly improves as operation proceeds.

The table below illustrates examples of applications of the above method for assessing a trajectory:

| Intended application | Control process to be optimized |
|---|---|
| Machine tools, robots | Positional control of an electrical machine for positional adjustment or motion control of robots |
| Drones or autonomous robots | Equilibrium control |
| Internal combustion engines | Air system control, in particular lambda control, injection control |

What is claimed is:

1. A computer-implemented method for creating a control process for a technical system using a Bayesian optimization method, the control process being created and executable based on model parameters of a control model, the method comprising the following steps to optimize the control process:
furnishing a quality function that corresponds to a trainable regression function, and that assesses a quality of a control process of the technical system based on model parameters; and
executing a Bayesian optimization method based on the quality to iteratively ascertain an optimized model parameter set having model parameters, such that during execution of each iteration of the Bayesian optimization method, a model parameter domain that indicates permissible respective value ranges for the model parameters is expanded, by an amount equal to an expansion distance, with respect to those dimensions for which a model parameter ascertained in a current iteration lies at a range boundary.

2. The method as recited in claim 1, the expansion distance with respect to the dimensions is indicated depending on a gradient of a Gaussian process posterior mean of the quality function at a point of a current estimate of an optimum, the expansion distance assuming a higher relative or absolute value, the greater the gradient.

3. The method as recited in claim 1, wherein the expansion distance is indicated with respect to the dimensions depending on a length scale of the model parameter in terms of the quality function, the expansion distance assuming a higher relative or absolute value, the longer the length scale.

4. The method as recited in claim 1, wherein the expansion distance depends, with respect to the dimensions, on an extent of the respective value range of the model parameter, the expansion distance assuming a higher relative or absolute value, the larger the respective value range.

5. The method as recited in claim 1, wherein the model parameters corresponding to, or are determined by, elements of a control matrix of a linear state control process.

6. The method as recited in claim 5, the respective value ranges for the model parameters are indicated depending on a mean of the distributions, on a scaling factor, and on a standard deviation.

7. A method for adaptive control of a technical system, the method comprising:
adapting model parameters of a control process of the technical system, continuously or at regular or predetermined times, during control of the technical system, the adapting including:
furnishing a quality function that corresponds to a trainable regression function, and that assesses a quality of the control process of the technical system based on the model parameters, and
executing a Bayesian optimization method based on the quality to iteratively ascertain an optimized model parameter set having model parameters, such that during execution of each iteration of the Bayesian optimization method, a model parameter domain that indicates permissible respective value ranges for the model parameters is expanded, by an amount equal to an expansion distance, with respect to those dimensions for which a model parameter ascertained in a current iteration lies at a range boundary.

8. An apparatus for creating a control process for a technical system using a Bayesian optimization method, the control process being created and executable based on model parameters of a control model, the optimize the control process, the apparatus being configured to:
furnish a quality function that corresponds to a trainable regression function and assesses a quality of a control process of the technical system based on model parameters;
carry out a Bayesian optimization method based on the quality function to iteratively ascertain an optimized model parameter set having model parameters, such that while the Bayesian optimization method is being carried out, in each iteration, a model parameter domain that indicates permissible respective value ranges for the model parameters is expanded, by an amount equal to an expansion distance, with respect to those dimensions for which a model parameter ascertained in a current iteration lies at a range boundary.

9. A control system, comprising:
a technical system; and
a control unit configured to control the technical system, a control model for furnishing an input variable vector depending on state variables of the technical system being implemented in the control unit, the control unit including a model creation block configured to ascertain model parameters for the control model based on a Bayesian optimization method executed in an optimization block, the Bayesian optimization method being carried out based on a specified quality function that is determined or specified in a quality function block, such that while the Bayesian optimization method is being carried out, a model parameter domain that indicates permissible respective value ranges for the model parameters is expanded, by an amount equal to an expansion distance, with respect to those dimensions for which a model parameter ascertained in a current iteration of the Bayesian optimization method lies at a range boundary.

10. A non-transitory machine-readable storage medium on which is stored a computer program for creating a control process for a technical system using a Bayesian optimization method, the control process being created and executable based on model parameters of a control model, the computer program, when executed by a computer, causing the computer to perform the following steps to optimize the control process:

furnishing a quality function that corresponds to a trainable regression function, and that assesses a quality of a control process of the technical system based on model parameters; and executing a Bayesian optimization method based on the quality to iteratively ascertain an optimized model parameter set having model parameters, such that during execution of each iteration of the Bayesian optimization method, a model parameter domain that indicates permissible respective value ranges for the model parameters is expanded, by an amount equal to an expansion distance, with respect to those dimensions for which a model parameter ascertained in a current iteration lies at a range boundary.

* * * * *